United States Patent
Dooley et al.

(10) Patent No.: US 9,840,997 B2
(45) Date of Patent: Dec. 12, 2017

(54) ENGINE STARTING SYSTEM USING STORED ENERGY

(71) Applicant: PRATT & WHITNEY CANADA CORP., Longueuil (CA)

(72) Inventors: Kevin A. Dooley, Toronto (CA); Keith Morgan, Westmount (CA); Tatjana Pekovic, Saint-Lambert (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 673 days.

(21) Appl. No.: 13/803,572

(22) Filed: Mar. 14, 2013

(65) Prior Publication Data

US 2014/0260306 A1    Sep. 18, 2014

(51) Int. Cl.
| | |
|---|---|
| F02N 11/08 | (2006.01) |
| F02C 7/26 | (2006.01) |
| H02P 9/48 | (2006.01) |
| H02P 9/02 | (2006.01) |
| H02P 1/00 | (2006.01) |
| H02P 101/30 | (2015.01) |

(52) U.S. Cl.
CPC ............ *F02N 11/0866* (2013.01); *F02C 7/26* (2013.01); *H02P 1/00* (2013.01); *H02P 9/02* (2013.01); *H02P 9/48* (2013.01); *H02P 2101/30* (2015.01)

(58) Field of Classification Search
CPC .. F02N 11/00; F02N 11/0885; F02N 11/0888; F02N 11/0862; F02N 11/0866; F02C 7/26; F02C 7/268; F05D 2260/85; F01D 19/00; B64D 33/00

USPC ........ 123/185.7, 179.28; 290/31, 30 A, 36 R
See application file for complete search history.

(56) References Cited

U.S. PATENT DOCUMENTS

| | | | |
|---|---|---|---|
| 5,552,681 A | 9/1996 | Suzuki et al. | |
| 5,587,630 A * | 12/1996 | Dooley | F02P 15/10 |
| | | | 315/209 CD |
| 5,899,411 A * | 5/1999 | Latos | B64D 33/00 |
| | | | 244/53 A |

(Continued)

FOREIGN PATENT DOCUMENTS

| | | |
|---|---|---|
| DE | 10 2009 057263 | 6/2011 |
| JP | H04 178144 | 6/1992 |

(Continued)

*Primary Examiner* — Charles Freay
*Assistant Examiner* — Kenneth J Hansen
(74) *Attorney, Agent, or Firm* — Norton Rose Fulbright Canada LLP

(57) ABSTRACT

There is described a method and system for starting at least one engine from a twin engine installation having a first engine arrangement and a second engine arrangement. The method comprises receiving a first voltage level from a power source and increasing the first voltage level to a second voltage level; charging an energy storage unit having at least a first super-capacitor and a second super-capacitor to the second voltage level; selectively connecting one of the first super-capacitor and the second super-capacitor to a first power control unit in the first engine arrangement; controlling a discharge current to a first electric machine in the first engine arrangement via the first power control unit; and rotating a rotor of the first electric machine to an above engine idle speed to start a first engine of the twin engine installation.

8 Claims, 7 Drawing Sheets

(56) References Cited

U.S. PATENT DOCUMENTS

| | | | |
|---|---|---|---|
| 6,351,090 B1 * | 2/2002 | Boyer | F02C 7/275 290/10 |
| 6,355,987 B1 | 3/2002 | Bixel | |
| 6,639,328 B2 | 10/2003 | Wacknov | |
| 7,513,119 B2 * | 4/2009 | Zielinski | F02C 7/262 60/204 |
| 7,704,110 B2 | 4/2010 | Wiatrowski et al. | |
| 7,958,727 B2 | 6/2011 | Arnold | |
| 7,963,264 B2 | 6/2011 | Reynolds | |
| 8,164,206 B2 * | 4/2012 | Gibson | F02N 11/0866 123/179.3 |
| 2004/0088991 A1 * | 5/2004 | Gallant | G05B 9/03 60/772 |
| 2008/0111524 A1 * | 5/2008 | Rydman | F02N 11/0866 320/166 |
| 2010/0038961 A1 * | 2/2010 | Divito | F02D 25/00 307/9.1 |

FOREIGN PATENT DOCUMENTS

| | | |
|---|---|---|
| WO | WO 99/00596 | 1/1999 |
| WO | WO2012059671 | 5/2012 |

* cited by examiner

ENGINE STARTING SYSTEM USING STORED ENERGY

TECHNICAL FIELD

The application relates generally to engine starting systems and more particularly, to starting systems based on energy storage devices.

BACKGROUND OF THE ART

Reliability is a critical feature for most vehicles, and particularly for aircrafts. In aircrafts, reliability may be improved using redundancy of components. Should one component fail, a backup is available. This strategy, however, causes reliability to be inversely proportional to desired costs and to desired overall weight. That is to say, the more redundancy is included in a design, the greater the costs and the greater the weight of the aircraft. As it is also desirable to maintain both costs and weight relatively low, there is a need for improvement to aircraft engine systems that would allow reliability to be increased without negatively affecting costs and weight.

SUMMARY

In one aspect, there is provided an engine starting system for a twin engine installation. The system comprises a first engine arrangement comprising a first electric machine; a second engine arrangement comprising a second electric machine; an energy storage unit coupled to the first engine arrangement and the second engine arrangement and having at least a first super-capacitor and a second super-capacitor; and a DC to DC converter configured to receive a first voltage level from a power source, increase the first voltage level to a second voltage level, and charge the first super-capacitor and the second super-capacitor to the second voltage level.

In another aspect, there is provided a method of starting at least one engine of a twin engine installation having a first engine arrangement and a second engine arrangement. The method comprises receiving a first voltage level from a power source and increasing the first voltage level to a second voltage level; charging an energy storage unit having at least a first super-capacitor and a second super-capacitor to the second voltage level; selectively connecting one of the first super-capacitor and the second super-capacitor to a first power control unit in the first engine arrangement; controlling a discharge current to a first electric machine in the first engine arrangement via the first power control unit; and rotating a rotor of the first electric machine to an above engine idle speed to start a first engine of the twin engine installation.

In yet another aspect, there is provided a method for simultaneously starting two engines in a twin engine installation having a first engine arrangement and a second engine arrangement. The method comprises receiving a first voltage level from a power source and increasing the first voltage level to a second voltage level; charging an energy storage unit having at least a first super-capacitor and a second super-capacitor to the second voltage level; applying power to the first engine arrangement from the first super-capacitor to start a first engine; and applying power to the second engine arrangement from the second super-capacitor to start the second engine.

DESCRIPTION OF THE DRAWINGS

Reference is now made to the accompanying figures in which.

DETAILED DESCRIPTION

Figure 1:
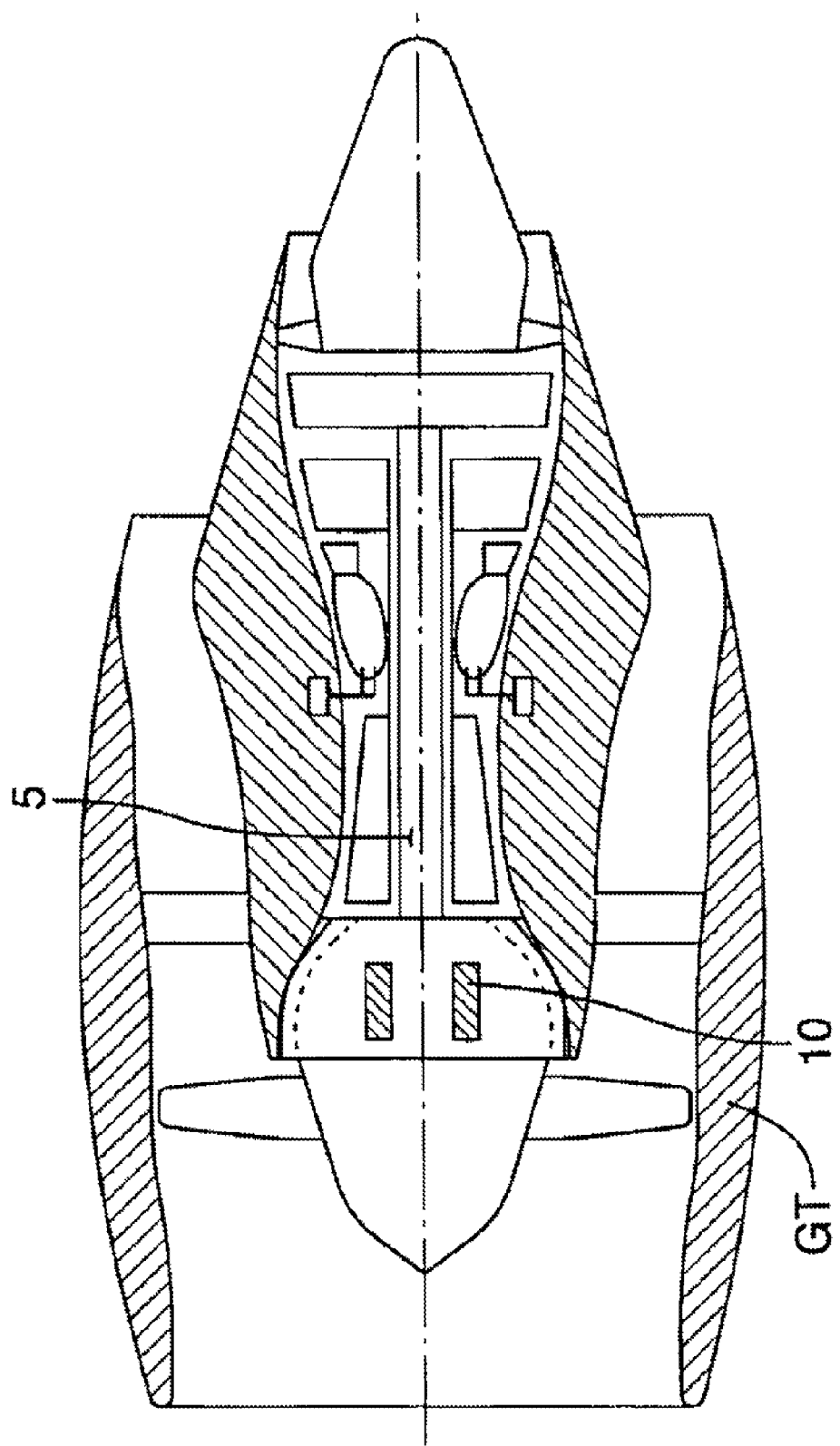
FIG. 1 shows a schematic cross-sectional view of an example of a gas turbine engine with an electric machine integrated therein.

There is described herein a starting system for incorporating into an engine having a twin engine installation. FIG. 1 illustrates an exemplary gas turbine (GT) engine for one of the two engines in the twin engine installation. An electric machine 10 driven by a shaft 5 operates within the gas turbine engine. Although the illustrated gas turbine engine is a turbofan, the system as described herein can be employed with a turboprop engine or a turboshaft engine and is not limited to application on aircraft engines. The engine may be an aircraft engine, a ship engine, a vehicle engine, etc. In alternative embodiments, the electric machine 10 may be provided in other types of engines, such as an electric engine and a more-electric engine.

The electric machine 10 is operable as either a motor or a generator, or both, depending on the associated control provided. The materials for the machine 10 may be any deemed suitable by the designer. Some exemplary materials are samarium cobalt permanent magnets, copper power and control windings, a suitable saturable electromagnetic material(s) for the stator teeth and power and control flux buses, such as Hiperco 50 alloy (a trademark of Carpenter Technology Corporation) may be used, although other suitable materials, such as electrical silicon steels commonly used in the construction of electromagnetic machines, may also be used. The rotor can be ferromagnetic, electromagnetic or a permanent magnet, and may be provided in an outside or inside configuration, or any other suitable configuration. The stator teeth, power and control flux buses may be integral or non-integral with one another, as desired.

Figure 2:
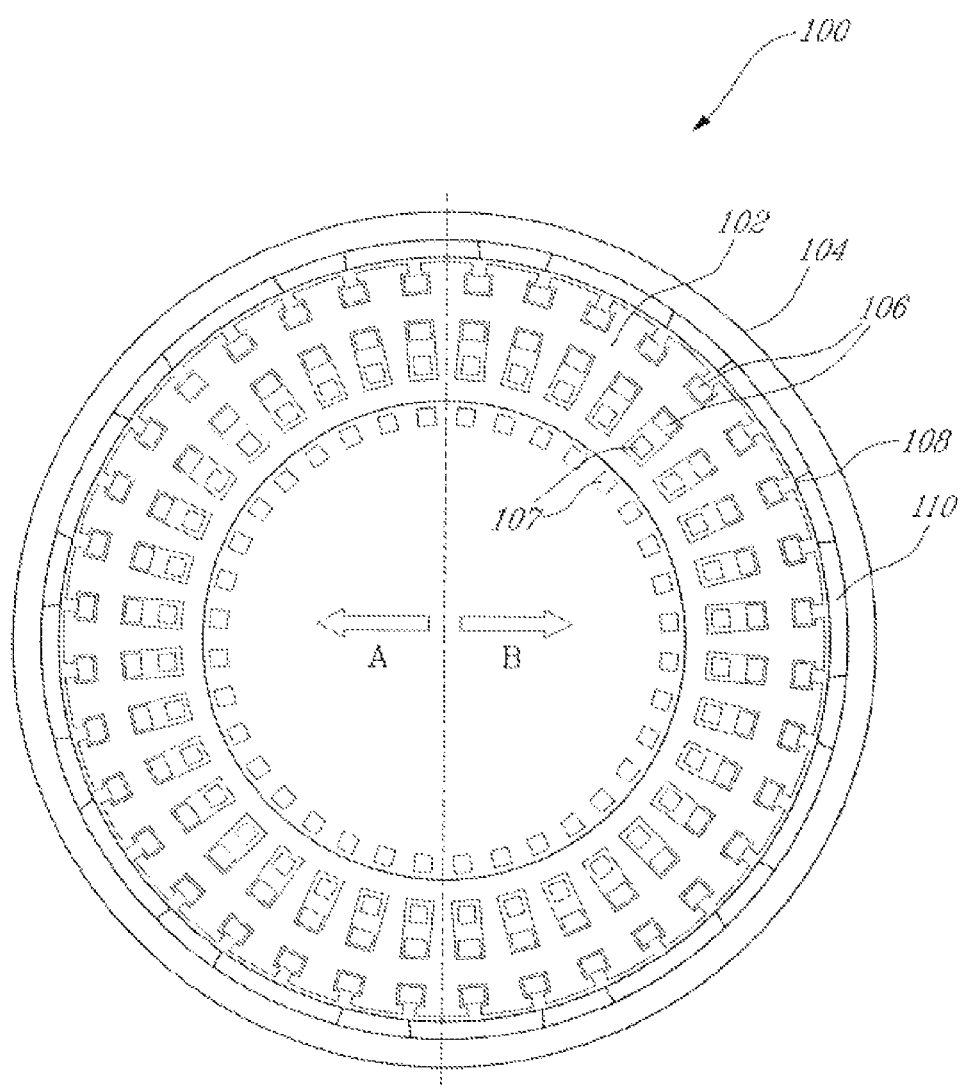
FIG. 2 is a schematic radial cross-sectional view of an example of an electric machine.

While machine 10 may have any suitable configuration, in this example it is illustratively a permanent magnet electric machine. FIG. 2 shows an example of an electric machine 100 described in U.S. Pat. No. 7,262,539, incorporated herein by reference, having two independent channel sections which in essence provide two separately controllable machines, namely machine A and machine B, within the same stator structure 102. The rotor 104 is shown as being outside the stator 102, but it can be inside if desired. Briefly, the stator 102 has a plurality of stator windings 106 provided in slots 108 of stator 102. Permanent magnets 110 are provided on the rotor 104. The channels A, B comprise independent and separated sets of windings 106, and thus machine 100 has a two-in-one electric machine design. The windings of channel A are confined to the sector of the stator indicated as "A" in FIG. 2, while the windings of channel B are confined to the sector of the stator indicated as "B" in FIG. 2. The windings are independently operable by a controller, and may be operated each in a motor and generator mode. For example, rotation of rotor 104 may be used to generate electricity in the windings 106 of channel A, while the windings of channel B are turned "off" via the control coils 107 effect on the magnetic properties of the stator sector. Alternately, the windings of channel B may also be turned "on" and also used to generate electricity in tandem with the windings of channel A. The control of the relevant stator, using DC current in the control winding is useful for both controlling the generator mode of the machine and the motor mode of the machine. In the generator mode of the machine, the DC control current controls the AC output current from the windings as is described in U.S. Pat. No. 7,262,539. In the motor mode, the control current is normally held at a fixed value unless a fault is detected in either the relevant motor winding or in the relevant motor drive circuit, at which point the control current would be set to zero and the relevant motor drive would be shut off, preventing current generated by the continued rotation of the machine from circulating in the fault circuit. The non-failed motor/motor drive channel is used to continue the rotation of the machine to drive the accessories, while repairs/replacement would be made at the next earliest opportunity.

The electric machine 10 may be standard or have a dual redundant configuration. One exemplary dual redundant configuration is a single stator dual rotor configuration. Other dual redundant configurations may also be applicable, as will be understood by those skilled in the art. The electric machine 10 may also have more than two channels by providing a single rotor rotating relative to multiple independent stators. In the case of dual channels, the rotor rotates relative to a first "virtual" stator and also relative to a second "virtual" stator. The electric machine 10 is thus a "two-in-one" machine in this case. The output of these two "machines" may then be combined, which permits the option of operating the "two machines" as one.

The machine 10 may be single or multi-phase. The windings may have single or multi turns per slot, the number of turns of windings does not have to equal the number of turns of control windings, the number of turns of a winding does not necessarily have to be a whole number, the number of primary windings does not have to equal the number of control windings, as one or more windings in a slot may perhaps be present in another slot. A variety of winding types may be used (squirrel cage, lap, etc.), and the windings may be any conductor(s) (i.e. single conductor, more than one wire, insulated, laminated, etc.) or may be superconductors. In multiphase machine, there may be zigzag, delta, or Y-connected windings in accordance with known techniques. There need not be an air gap between the primary and control winding, as long as the windings are electrically isolated from one another.

Figure 3:
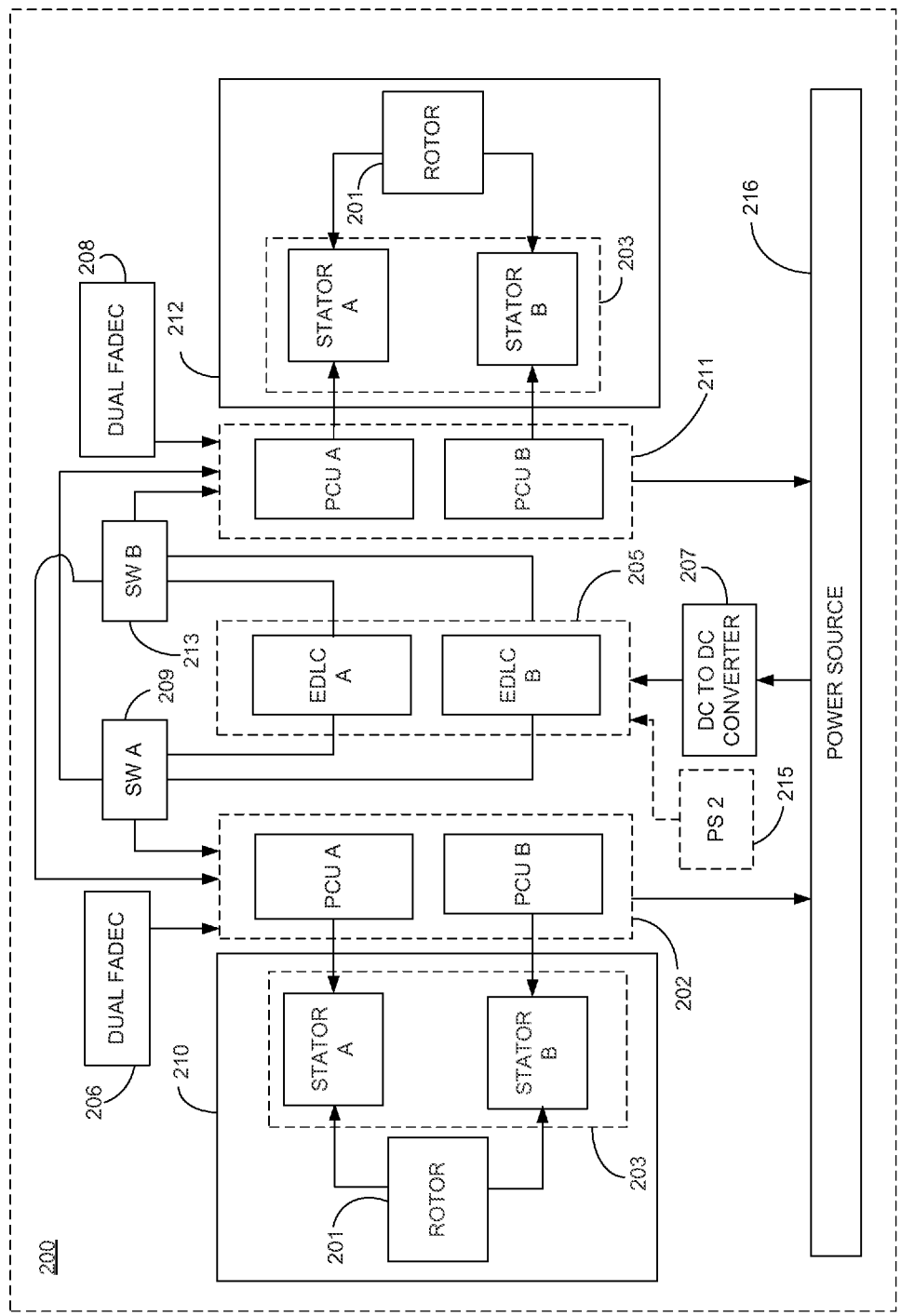
FIG. 3 is a block diagram of an exemplary starting system for a twin engine installation.

Turning now to FIG. 3, there is illustrated an exemplary starting system 200 for a twin engine installation, incorporating the electric machine 10 described above. In this example, two electric machines 10 operate as starter-generators 210, 212 and comprises a single rotor 201 dual stator 203 configuration. The starter-generators 210, 212 are used for starting the engines and also generating electricity when the engines are in operation. Two separate sets of stator windings (Stator A, Stator B) 203 are used to drive a common rotor 201 in each starter-generator 210, 212. The two stators 203 each output electricity via their respective sets of windings during the generation mode of operation.

The dual channel single rotor starter-generators 210, 212 are controlled by a respective dual channel full authority digital engine control (FADEC) 206, 208 via respective dual channel power control units (PCU A, PCU B) 202, 211. The FADECs 206, 208 may comprise an electronic engine controller (EEC) or engine control unit (ECU) and its related accessories in order to control all aspects of engine starting performance. In particular, the dual FADECs 206, 208 control the input current to both starter channels of the starter-generators 210, 212 based on any one of a number of input parameters, such as speed, temperature, altitude, and forward speed. The FADEC may also control the phase angle of the switching sequence to the motor as a function of speed as a means to compensate for phase errors in the motor system The starter-generator 210, dual FADEC 206 and dual channel PCU 202 form a first engine arrangement for starting the first engine of the twin engine installation. The starter-generator 212, dual FADEC 208 and dual channel PCU 211 form a second engine arrangement for starting the second engine of the twin engine installation. An energy storage unit 205 is coupled to both the first engine arrangement and the second engine arrangement. The energy storage unit 205 comprises at least a first super-capacitor and a second super-capacitor. More than two super-capacitors may be provided in the energy storage unit 205. In some embodiments, as illustrated in FIG. 3, the two super-capacitors are electrical double-layer capacitors (EDLC A, EDLC B). For example, the Boostcap® ultra capacitor from Maxwell Technologies (datasheet BMOD0094 P075 B02) with a rated voltage of 75V may be used. Other types of super-capacitors include pseudo-capacitors and hybrid capacitors.

A single DC to DC converter 207 receives a first voltage level from a power source 216 and increases the first voltage level to a second voltage level. The power source 216 may take various forms, such as a single battery, a combination of multiple batteries, a ground power supply, an engine driven generator, and a rotor driven generator. The super-capacitors are then charged to the second voltage level by the DC to DC converter 207. This allows the super-capacitors in the energy storage unit 205 to be charged to a higher voltage than is typically available from an aircraft starting supply. For example, the super-capacitors may be charged to approximately 72V from a 28V aircraft supply using a 28V to 72V inverter as the DC to DC converter 207. Charging may take place over an extended period of time, and maintaining the charge on the super-capacitors requires a relatively small amount of energy once the initial charge is completed. In addition, the super-capacitors may continue to receive charging current during the starting process, if desired. Since the charging rate can be orders of magnitude slower than the discharging rate during an engine start, the power source 216 can provide power via a single DC to DC converter 207 at a rate which optimizes battery efficiency (in the case of a battery) in terms of its discharge curve. This may allow many more starts from a battery of a given capacity. This may also allow a smaller, and thus lighter, battery to be used.

Each super-capacitor may then be used as a high voltage source to provide power to one of the engine arrangements, for starting the first engine and/or the second engine, up to above an idle engine speed. Each super-capacitor of the energy storage unit 205 may be connected directly to one of the engine arrangements, or alternatively, a switching module, comprising switches 209, 213, may be used to selectively connect the super-capacitors to a desired one of the two engine arrangements, thus making the super-capacitors interchangeable and capable of starting either one of the engines. The super-capacitors may be connected to the engine arrangements via the dual channel PCUs 202, 211 instead of directly into the starter-generators 210, 212. This allows the discharge current to the starter-generators 210, 212 to be controlled by the PCUs 202, 211 via the dual FADECs 206, 208, respectively, thus maximizing an efficiency of both the starter-generators 210, 212 and the super-capacitors.

In some embodiments, an alternate or backup power source 215 may also be provided. This power source 215 may be any independent power source and may also be used to feed the energy storage unit 205, for the purposes of charging, recharging, and/or maintaining a charge thereon. It may also be provided simply as a redundant power source in case of failure of the primary power source 216. The alternate power source 215 may be, for example, an airframe supplied, transmission mounted generator operating at 3.6 KW, 72V, and 50 A. Other types of power sources may also be used.

The configuration of FIG. 3 allows the optimization of the starting speed and acceleration profile, which improves the starting of a gas turbine engine. Dual redundant starting capabilities are also provided for single engine starting. In addition, both engines of the twin engine installation may be started simultaneously, if desired.

Figure 4:
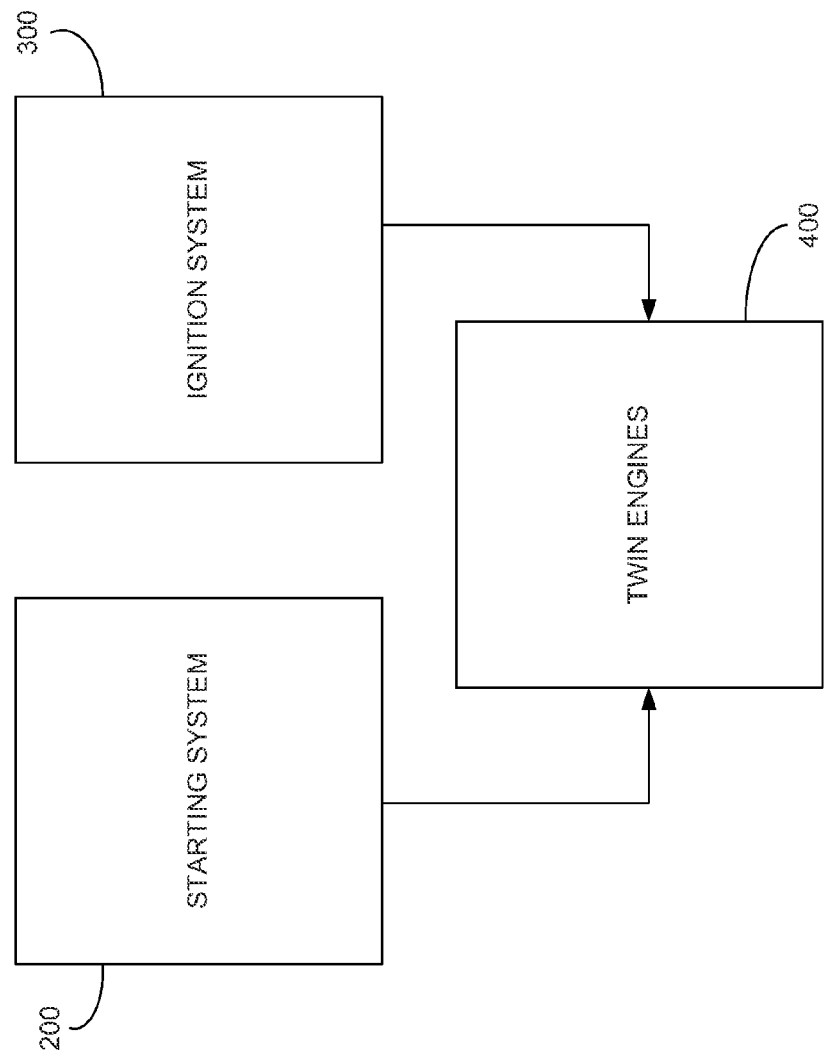
FIG. 4 is a block diagram of an exemplary starting/ignition system for an engine.

Turning now to FIG. 4, there is illustrated en embodiment where the starting system 200 is used in conjunction with an ignition system 300 to start one or both of the twin engines 400. In some embodiments, the ignition system 300 is a continuous plasma ignition system, as described in U.S. Pat. No. 5,587,630, the contents of which are hereby incorporated by reference. Although illustrated as separate, the ignition starting system may be incorporated directly into the first engine arrangement and the second engine arrangement, such that a separate continuous plasma ignition system is used for lighting each one of the engines in the twin engine installation. Alternatively, a single continuous plasma ignition system is used for both engine arrangements, in a switchable configuration.

In some embodiments, the ignition system 300 comprises a dual redundant configuration, similarly to the starting system 200. For example, dual ignition exciters, dual air gap ignitors and dual sets of electrically shielded cables to interface the exciters are provided for each ignition system 300. In the case of one ignition system 300 per engine of the twin engine configuration, an ignition system 300 with dual redundant configuration is provided for each engine arrangement 210, 212. Alternatively, one dual redundant ignition system is switchable between the first engine arrangement 210 and the second engine arrangement 212.

Figure 5:
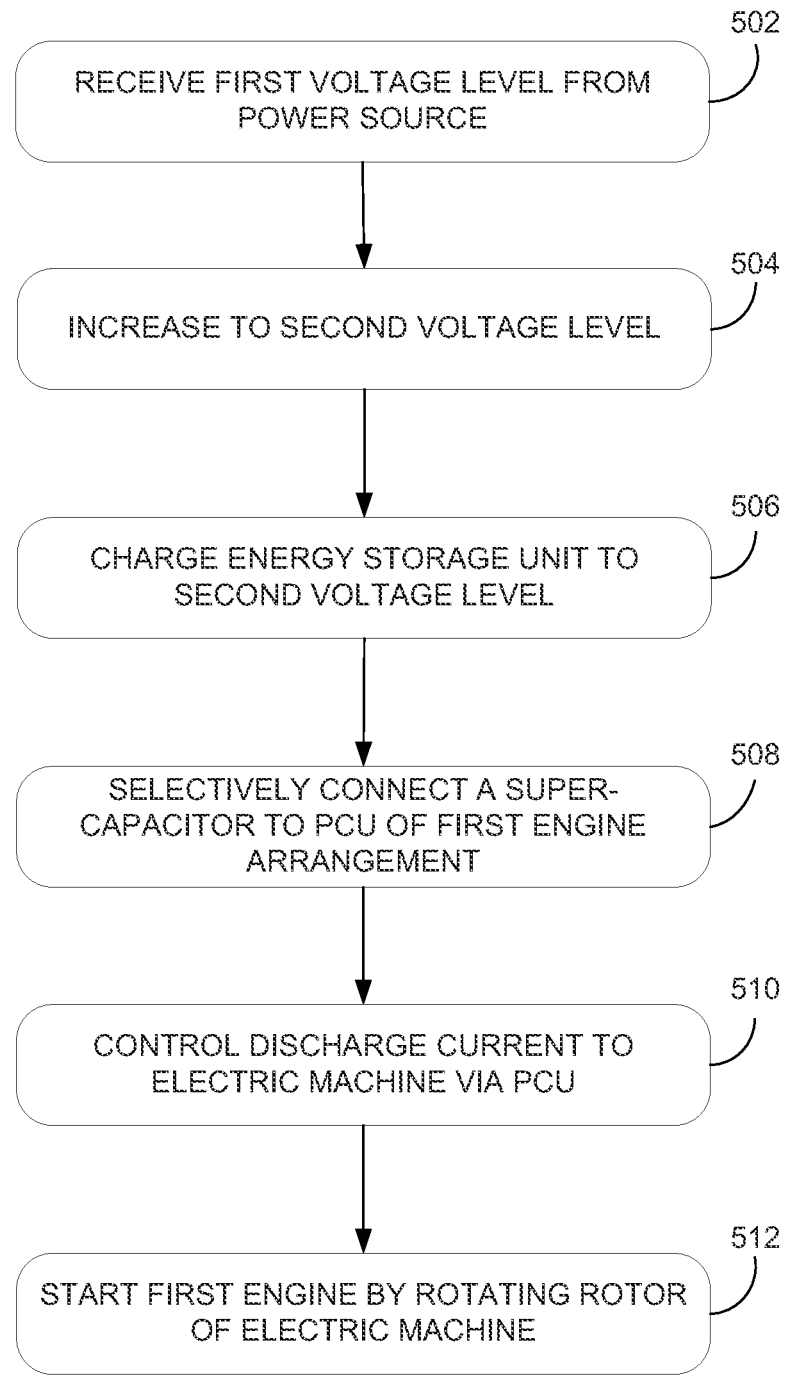
FIG. 5 is a flowchart of an exemplary method for starting one engine with a starting system as per FIG. 3.

FIG. 5 illustrates an exemplary method of starting at least one engine of a twin engine installation having a first engine arrangement and a second engine arrangement. As depicted in FIG. 3, each engine arrangement may comprise, but does not require, an electric machine with a single rotor dual stator configuration operating as a starter-generator, a dual channel PCU, and a dual FADEC. In a first step 502, a first voltage level is received from a first power source. The first voltage level is increased to a second voltage 504 and used to charge an energy storage unit with at least two electrically separate super-capacitors 506. At least one of the two super-capacitors is selectively connected to the PCU of one of the engine arrangements 508 and current is controllably discharged through the PCU to the electric machine 510. At least one of the twin engines is thus started by rotating a rotor of the electric machine to an above engine idle speed 512.

As indicated above, the first voltage level may be received from any one of a single battery, a plurality of batteries, a ground power supply, an engine driven generator, and a rotor driven generator. Should it be desired to use the second super-capacitor to start the first engine, it may be switched from the second engine arrangement to the first engine arrangement.

Figure 6:
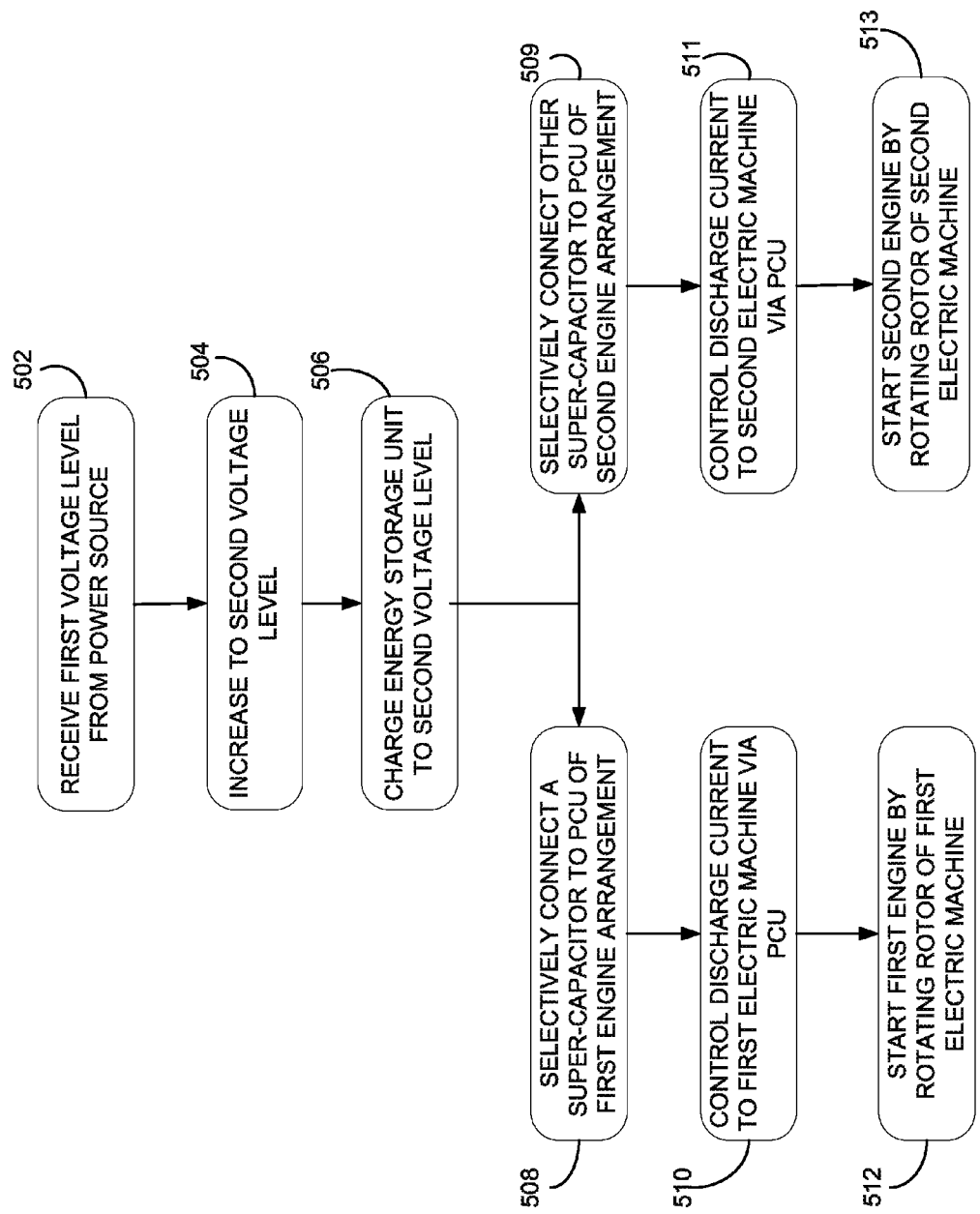
FIG. 6 is a flowchart of an exemplary method for starting two engines simultaneously with a starting system as per FIG. 3.

FIG. 6 illustrates an exemplary method for concurrently starting both engines of a twin engine installation. Once the energy storage unit has been charged to a second voltage level greater than the first voltage level as received, one super-capacitor is connected to the PCU of the first engine arrangement 508 while the other super-capacitor is connected to the PCU of the second engine arrangement 509. Discharge current is controlled independently to each one of the first electric machine and the second electric machine via their respective PCUs 510, 511. Each engine is started by rotation of a rotor of a respective electric machine, 512, 513.

Figure 7:
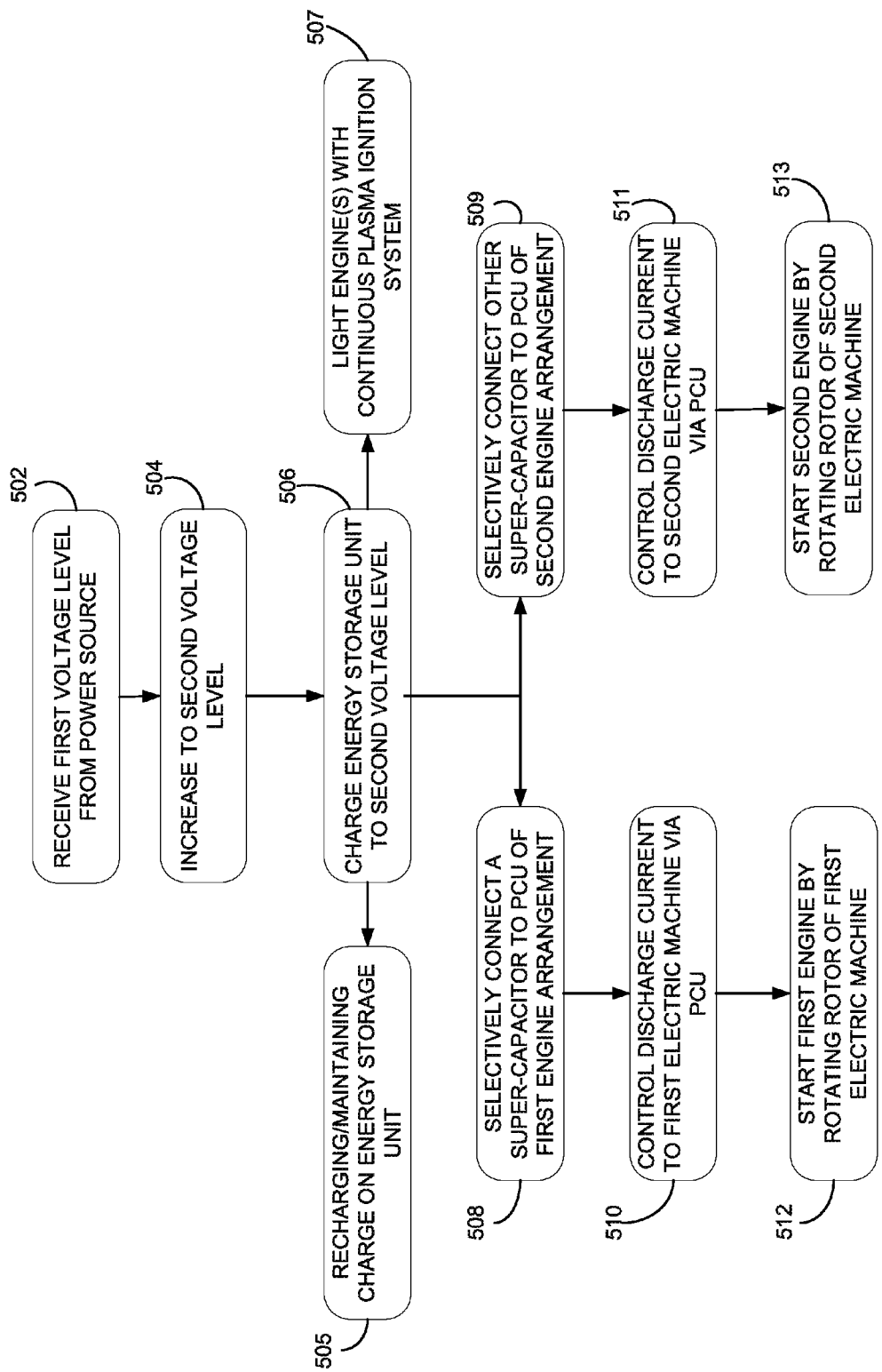
FIG. 7 is a flowchart of an alternative embodiment for the method of starting two engines simultaneously with a starting system as per FIG. 3.

As illustrated in FIG. 7, the method may also comprise a step of recharging/maintaining the charge on the energy storage unit 505. This may be done by the DC to DC converter or by the alternative or backup power source. The engine(s) may also be lit using one or more of the respective continuous plasma ignition systems 507.

While illustrated in block diagrams as groups of discrete components communicating with each other via distinct data signal connections, it will be understood by those skilled in the art that the present embodiments may be provided by a combination of hardware and software components, with some components being implemented by a given function or operation of a hardware or software system, and some of the data paths illustrated being implemented by data communication within a computer application or operating system. For example, the power control units 202, 211 may be implemented using hardwired logic, Field-Programmable Gate Arrays (FPGAs), analog systems, etc. The structure illustrated is thus provided for efficiency of teaching of the present embodiment, which can be carried out as a method or embodied in a system. The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of starting at least one engine of a twin engine installation having a first engine arrangement and a second engine arrangement, the method comprising:

receiving a first voltage level from a third power source and increasing the first voltage level to a second voltage level;

charging an energy storage unit having at least a first super-capacitor and a second super-capacitor to the second voltage level, the first super-capacitor acting as a first power source and the second super-capacitor acting as a second power source;

selectively connecting one of the first super-capacitor and the second super-capacitor to a first power control unit in the first engine arrangement, the first super-capacitor arranged to selectively connect to the first engine arrangement and the second engine arrangement to provide starting power as the first power source, the second super-capacitor arranged to selectively connect to the first engine arrangement and the second engine arrangement to provide starting power as the second power source, wherein selectively connecting one of the first super-capacitor and the second super-capacitor comprises switching the one of the first super-capacitor and the second super-capacitor from a connection with a second electric machine in the second engine arrangement to a connection with the first electric machine in the first engine arrangement;

controlling a discharge current to a first electric machine in the first engine arrangement via the first power control unit; and rotating a rotor of the first electric machine to an above engine idle speed to start a first engine of the twin engine installation.

2. The method of claim 1, wherein receiving the first voltage level from the third power source comprises receiving the first voltage level from a single battery.

3. The method of claim 1, wherein receiving the first voltage level from the third power source comprises receiving the first voltage level from one of a ground power supply, an engine driven generator, and a rotor driven generator.

4. The method of claim 1, further comprising lighting the at least one engine using a continuous plasma ignition system.

5. The method of claim 1, further comprising at least one of recharging and maintaining a charge on the first super-capacitor and the second super-capacitor using a backup power source that is transmission mounted.

6. The method of claim 1, further comprising:

selectively connecting the other one of the first super-capacitor and the second super-capacitor to a second power control unit in the second engine arrangement;

controlling a discharge current to a second electric machine in the second engine arrangement via the second power control unit; and rotating a rotor of the second electric machine to an above engine idle speed to start a second engine of the twin engine installation.

7. The method of claim 6, wherein rotating the rotor of the second electric machine comprises doing so concurrently with rotating the rotor of the first electric machine to simultaneously start the first engine and the second engine of the twin engine installation.

8. The method of claim 1, further comprising continuing to charge the energy storage unit as the first engine is started.

\* \* \* \* \*